3,105,851
SEPARATION OF RECOVERABLE MATERIALS FROM OXIDATION BY-PRODUCTS

James O. Knobloch, Hobart, Ind., and Hsiang P. Liao, Park Forest, Ill., assignors to Standard Oil Company, Chicago, Ill., a corporation of Indiana
No Drawing. Filed Dec. 30, 1957, Ser. No. 705,754
12 Claims. (Cl. 260—525)

This invention relates to benzene carboxylic acids having fewer than three carboxyl groups in the molecule. More particularly the invention is concerned with an improved process for the purification of crude benzoic acid and phthalic acids which are contaminated with colored tar-like oxidation by-products. In another aspect, this invention provides means for recovering and recycling oxidation catalysts employed for the oxidation of aliphatic-substituted benzenes with molecular oxygen.

Benzoic acid and the three isomeric phthalic acids, orthophthalic, isophthalic, and terephthalic, may be prepared by oxidizing the corresponding aliphatic-substituted benzene with molecular oxygen as the oxidizing agent and conducting the reaction in the liquid phase in the presence of a heavy metal catalyst. Typical benzene compounds having oxidizable aliphatic substituents include the alkyl benzenes such as the xylenes and the diisopropyl benzenes, the alkyl-substituted benzoic acids such as the cumic and the toluic acids, and the esters of alkyl-substituted benzoic acids such as the methyl toluates. Preferred oxidation catalysts are the known heavy metal catalysts such as cobalt, manganese, and cerium, which may be employed either in elemental form or a compound such as a naphthenate, acetate, nitrate, or hydroxyquinolate. For the obtention of high yields of phthalic acids, the metal oxidation catalyst is advantageously promoted by the presence of bromine, or by a substance capable of providing bromine such as ammonium bromide or HBr. Details of many commercial oxidation processes which employ molecular oxygen are described in the April 6, 1957, issue of Chemical Week, pages 33–42, and in references listed therein.

In metal-catalyzed molecular-oxygen oxidation processes, a small amount of a deep yellow or tan-colored tar-like oxidation by-product is almost invariably formed which greatly complicates the benzene carboxylic acid recovery and purification. When, for example, it is attempted to recrystallize benzene carboxylic acids which are contaminated with tar-like by-products from water, the presence of these tars inhibits crystallization despite shock chilling or "seeding" with crystals. In point of fact, contaminated aqueous orthophthalic acid solutions have remained stable for months even though they contained five times the saturated concentration of the acid. In all oxidation processes employing molecular oxygen and metal oxidation catalysts, the art is confronted with the problem of removing these tar-like contaminants from the products and, in the past, drastic and expensive measures have been necessary. With orthophthalic acid, for example, which is marketed as phthalic anhydride crystals having a molten Hazen (APHA) color of 50 maximum, a commercial method of achieving desired purity comprises heating the molten anhydride for several hours in the presence of concentrated sulfuric acid, neutralizing the acid with sodium carbonate, and thereafter distilling pure phthalic anhydride from the melt. Also, aside from the difficulty they contribute to the purification of the acids, these tars are particularly troublesome in commercial oxidations employing a bromine-promoted heavy metal catalyst since the chemical nature of the tars is such that they may inhibit the oxidation if allowed to accumulate in a reaction mixture. An accumulation may occur if the oxidation catalyst is recycled without providing effective means for excluding the tar-like by-products.

Accordingly, it is an object of the present invention to provide an improved method of purifying crude benzoic acid and phthalic acids which are contaminated with tar-like by-products of the metal-catalyzed molecular-oxygen oxidation of aliphatic-substituted benzenes to benzene carboxylic acids having fewer than three carboxyl groups. A further object is to provide a method for separating heavy metal oxidation catalysts from tar-like by-products. Yet another object is to facilitate the purification of benzene carboxylic acids by recrystallization from aqueous solutions. Other and more particular objects will become apparent as the description of this invention proceeds.

In accordance with the objects above, it has now been discovered that the tar-like by-products of a metal-catalyzed molecular oxygen oxidation process will coalesce and precipitate as a water-insoluble oil or tar-like phase from an aqueous medium upon treating with a strong acid such as hydrochloric acid. This however is applicable only where the tars derive from the oxidation of aliphatic-substituted benzenes having fewer than three aliphatic groups in the molecule since, for some reason, tar-like by-products from the preparation of benzene carboxylic acids having three or more carboxyl groups are soluble in aqueous strong acid solutions. These tar-like by-products may be coalesced either by treating the by-products with the strong acid contained in an aqueous medium, or by dissolving the by-products in water and then adding a strong acid. In either event, recoverable benzene carboxylic acids and/or the oxidation catalyst remain in the aqueous solution and are recovered therefrom after the coalesced water-insoluble by-products are removed. It has also been discovered that any heavy metal oxidation catalysts which are present remain in solution after acidification, and do not concentrate either in the water-insoluble tar phase nor occlude on crystallized benzene carboxylic acids.

By these discoveries and their application to the purification of benzene carboxylic acids, all of the foregoing objects may be attained in convenient, low-cost manner. According to one aspect of the present invention, one or more benzene carboxylic acids which is contaminated with tar-like by-products alone, or with tar-like by-products and an oxidation catalyst, is purified by dissolving the contaminated aromatic acid in an aqueous solvent and coalescing and precipitating the tar-like oxidation by-products in the presence of a strong acid. As employed herein, the term "aqueous solvent" includes both water and water containing the strong acid. The benzene carboxylic acid may then be recovered in substantially pure form by cooling the solution and crystallizing the carboxylic acid therefrom, or by evaporating or flashing the solution or the like. Oxidation catalysts remaining in the mother liquor after crystallization may be recovered by such means as precipitation by the addition of an alkali metal hydroxide or carbonate.

According to another aspect of the present invention, these discoveries are applied with particular advantage to the recovery of benzene carboxylic acids, particularly the relatively water-soluble benzoic acid and orthophthalic acids, and/or the oxidation catalysts from a distillation bottoms fraction containing tar-like oxidation by-products from which volatile components such as inert reaction solvents have previously been distilled. Heretofore, the recovery of benzene carboxylic acids or oxidation catalysts from distillation bottoms has been extremely difficult because of the absence of completely satisfactory solvents which would not at the same time dissolve a large portion of the tar-like oxidation by-products. By the employment of this invention, this difficulty is overcome and one may recover benzene carboxylic acids and/ or oxidation catalysts from a distillation bottoms merely by extracting the benzene carboxylic acid and/or the catalyst with an aqueous solvent, and in the presence of a strong acid causing the oxidation by-products to separate while the extract containing only the benzene carboxylic acid and/or the catalyst is treated for the recovery of these components. It is preferred to conduct the extraction of distillation bottoms with water containing the strong acid, rather than with water alone, for this has the advantage that the strong acid, particularly when present in at least a stoichiometric amount based on the metal catalyst, facilitates extraction of the oxidation catalyst.

Strong acids which are suitable for coalescing and precipitating tar-like oxidation by-products from a water solution are those acids which have ionization constants greater than $1.26 \times 10^{-3}$ at 25° C., i.e., those which are stronger than the benzene carboxylic acids. It is preferred to employ the strong completely-ionized mineral acids such as nitric, sulfuric, hydrochloric, or hydrobromic acids since only a small amount of these are needed, although the weaker mineral acids such as iodic, phosphoric, and sulfurous acids are operable but in larger concentrations. Even the stronger organic acids such as dichloroacetic, difluoroacetic, trichloroacetic, trifluoroacetic, oxalic and picric acids may be used. It is manifest that to maintain the metal oxidation catalyst in the liquid phase without causing precipitation, the strong acid must be one which does not form a precipitate with the metal.

Oxidation catalysts which are employed for liquid phase molecular-oxygen oxidations of aliphatic-substituted benzenes, either in the presence or in the absence of bromine, are elemental forms of metals or compounds containing metals which are desirably selected from the heavy metals group as defined in the "Periodic Chart of Elements" at pages 56 and 57, Handbook of Chemistry, 8th Edition, Handbook Publishers Inc., Sandusky, Ohio, 1952. Most suitable of the heavy metals are those having atomic numbers between 23 and 28 inclusive, viz., vanadium, chromium, manganese, iron, cobalt and nickel. Excellent results are attained with manganese, cobalt, nickel, chromium, vanadium, molybdenum, tungsten, lead, cerium and neodymium. In many instances synergistic effects are observed, as with cobalt and manganese, and more than one metal oxidation catalyst may be recovered from a distillation bottoms by the employment of the present invention.

As previously stated, the discovery that colored tar-like oxidation by-products coalesce and precipitate from an aqueous solution in the presence of a strong acid has two primary applications to processes for the purification of benzene carboxylic acids. The first application is where one or more of the acids is contaminated with tar-like by-products alone, or with by-products and oxidation catalysts. For this, the contaminated benzene carboxylic acid is dissolved in an aqueous solvent, the tars are coalesced and precipitated in the presence of a strong acid, and the benzene carboxylic acid is recovered from the tar-free aqueous solution as by crystallization, while any catalyst is optionally recovered from the mother liquor. Since addition of the strong acid removes the tars which inhibit crystallization, the benzene carboxylic acid may readily be recovered from the acidified solution merely by cooling and crystallization.

Thus, when purifying one or more benzene carboxylic acids which is contaminated with tar-like by-products and/or oxidation catalysts, the initial processing step is to dissolve the crude acid in an aqueous solvent. The aqueous solvent may comprise water (in which event the strong acid is added after dissolving the benzene carboxylic acid), water containing the strong acid, or an aqueous solvent containing a solubilizing agent such as an organic sulfonate detergent or one of the lower alcohols. Since, as shown in Table I below, all of the benzene carboxylic acids are relatively insoluble at low temperatures, the solution is preferably obtained by dissolving the acids at an elevated temperature so as to reduce the required amount of solvent and minimize the difficulties in handling large volumes of liquid. Water alone, rather than water containing the strong acid, is preferably employed as the aqueous solvent in order to avoid the necessity of constructing dissolving or extraction equipment of corrosion resistant materials and to save on the quantity of acid employed.

The aqueous solution may also be prepared by extraction, as in the case when a mixture of benzoic acids and the three phthalic acids is produced by the catalytic oxidation of isomeric mixed petroleum xylenes and ethylbenzene, and water extraction is employed to separate the benzene carboxylic acids according to their relative solubilities in water. Then the aqueous extracts containing the more soluble benzene carboxylic acids are treated according to the process of the invention. In any event, a dissolving and acidifying temperature in the range of from about 50 to 150° C. is preferred, although the temperature may range as low as 20° C. if large quantities of liquid may be tolerated, to about 250° C. or even higher.

In Table I below, the solubilities of benzene carboxylic acids in water at various temperatures are shown. In the table, benzoic acid is designated "BA," and orthophthalic acid is designated "PA."

TABLE I

Solubility of benzene carboxylic acids in water, gm./100 gm. water

| Temperature | | BA | PA |
|---|---|---|---|
| ° F. | ° C. | | |
| 122 | 50 | 0.84 | 1.73 |
| 150 | 66 | 1.56 | 3.3 |
| 200 | 93 | 6.4 | 13.0 |
| 250 | 121 | (50) | 59.0 |
| 300 | 149 | ---- | 190.0 |
| 350 | 177 | ---- | ----- |
| 400 | 204 | ---- | ----- |

After dissolving the benzene carboxylic acid in water, it is preferred to filter the solution so as to remove solids such as insoluble phthalic acids or coke. Then a sufficient amount of a strong acid such as hydrochloric acid is gradually added to effect the coalescing and precipitation of the tar-like by-products. The coalescing temperature may be the temperature which the solution is initially prepared or may be either higher or lower; the temperature should not however be substantially below the temperature corresponding to the saturation of the benzene carboxylic acid in water at the concentration involved so as to avoid precipitating the carboxylic acid along with the tars. Ordinarily, when the crude benzene carboxylic acid is dissolved in water alone the solution has a reddish color due to the tars, but when a sufficient amount of strong acid is present or is added to coalesce the tars, the solution clears almost instantly and preserves only that color which is due to the presence of the metal oxidation catalyst. This color change is a convenient method of monitoring the addition of the minimum amount of strong acid. As little as 0.1 percent of a strong acid by weight of the solution, or as much as 25% or higher concentration may be used although a concentration of between 0.5 and 2.0 weight percent of an acid such as hydrochloric is entirely suitable and is preferred. Upon acidification, the tar-like by-products together with some benzoic acid precipitates to form a rather viscous oil or tar-like phase which is heavier than the aqueous solution and gradually settles to the bottom. At low temperatures it forms a tan-colored solid.

The coalesced insoluble tar-like by-products may if desired be withdrawn and re-extracted with an acid-containing aqueous solvent to recover any additional benzene carboxylic acids contained therein. However, in most instances the quantity of carboxylic acids in the insoluble tar phase is small if precipitation is effected from an unsaturated solution, and consequently it is usually most economical to discard the entire water-insoluble tar phase.

The acidified tar-free aqueous solution containing the bulk of the benzene carboxylic acid is then treated for recovery of the product. If dissolving the contaminated carboxylic acid and precipitation of the tars are conducted at high temperatures, the aromatic acids are conveniently recovered merely by cooling the solution to a lower temperature in order to crystallize the benzene carboxylic acids, and thereafter separating the acid crystals by filtration or by the equivalent use of centrifuges, settling tanks, or hydrocyclones. Alternatively, or in conjunction with crystallization, the by-product-free solution may be partially or completely evaporated, spray dried, or flashed into a lower pressure to concentrate the benzene carboxylic acids in the form of a slurry. Crystallization, however, is preferred as the recovered crystalline benzene carboxylic acids are then free from the strong acids and the catalysts. The small amount of benzene carboxylic acids remaining in the mother liquor may either be recovered by evaporation or may be recycled with the solvent to the dissolving step.

Heavy metal oxidation catalysts may be recovered from the aqueous solution remaining after recovery of the benzene carboxylic acids by alkalizing the solution and precipitating the heavy metals in the form of their insoluble oxides or hydrated oxides. For this purpose either ammonia, an alkali metal hydroxide such as sodium hydroxide or potassium hydroxide or a base-acting salt such as sodium carbonate may be added. The metal oxidation catalyst settles to the bottom and may be filtered off and re-used in the oxidation.

The second primary application of the present invention is to the extraction and recovery of benzene carboxylic acids and/or oxidation catalysts from a distillation bottoms containing tar-like by-products and from which volatile components have previously been distilled. For this application, distillation bottoms are extracted with an aqueous solvent, i.e. water alone or water containing a strong acid, the extract is separated from the by-products in the presence of a strong acid, and the benzene carboxylic acid and/or the oxidation catalyst are recovered from the extract by means similar to those employed for the purification of benzene carboxylic acids.

For example, a distillation bottoms fraction may be derived from distilling at least a portion of the reaction mixture from a liquid-phase metal-catalyzed molecular-oxygen oxidation process so as to remove inert reaction solvents such as acetic acid, water, and perhaps volatile benzene carboxylic acids, or by first filtering the reaction mixture to remove insoluble phthalic acids and then distilling the filtrate. The composition of a distillation bottoms depends upon the feedstocks oxidized, the previous treatment of the reaction mixture, e.g. whether it has been filtered to remove substantially-insoluble phthalic acids (primarily terephthalic and isophthalic), and whether the bottoms has been distilled to remove all or part of the volatile benzoic and o-phthalic acids. For example, in the oxidation of pure p-xylene to produce terephthalic acid, substantially all of the product is recovered by filtration and the distillation bottoms consists of only a trace of terephthalic acid, together with oxidation tars and catalysts. But where mixed xylenes are oxidized, the bottoms contains most of the tar-like by-products, much of the oxidation catalyst, and anywhere from 1% to as much as 80% by weight of aromatic acids. There is economic justification for recovering the catalyst as it is somewhat costly and should be recycled if it can be recovered in a low cost manner free from tar-like by-products, as may be accomplished by employing the process of this invention.

Distillation bottoms are frequently available as tower bottoms in the form of a melt at a temperature of about 130° C. or higher, and the benzene carboxylic acid solution is advantageously prepared by extracting the melt with the aqueous solvent while the former is in the liquid state so as to reduce heating requirements and to permit intimate contact between the solvent and the bottoms. Again, the extraction temperature is preferably between about 50 and about 150° C., but may be either lower or higher, depending upon the particular economics, e.g. solvent heating costs, the cost of providing pressure containing equipment, etc. Here however the extraction is preferably conducted with water already containing the strong acid in stoichiometric amounts on catalyst so as to render the catalyst more soluble. Where a distillation bottoms contains both catalyst and benzene carboxylic acids, the catalyst is the most soluble constituent. The amount of solvent required will depend upon the concentration of benzene carboxylic acid in the bottoms and the solubility of the particular carboxylic acid in water, with more solvent being required for isophthalic or terephthalic than orthophthalic.

In a manner similar to that employed for the purification of phthalic acids, the tar-like byproducts coalesce and precipitate from the aqueous solution in the presence of a strong acid, and the water-insoluble tar-like by-products are separated from the extract. Recovery of phthalic acids and/or oxidation catalysts is also conducted in the same manner.

To more fully disclose the various applications of this invention, the following examples are presented. In each example the source of benzene carboxylic acids was the metal-bromine catalyzed air oxidation of mixed petroleum xylenes. "Parts" refers to parts by weight.

*Example I*

Coalescing of tars in the presence of a strong acid is first applied to the extraction of soluble benzene carboxylic acids from a distillation bottoms.

A commercial mixture of petroleum xylenes containing 23.6 weight percent orthoxylene, 45.4% metaxylene, 18.0% paraxylene, and 13.0% ethylbenzene with a trace of toluene is oxidized with air while in an equal volume of a glacial acetic acid medium and in the presence of a manganese-cobalt-bromine mixture as the catalyst at a temperature of 200° C. and a pressure of 28 atmospheres. At the completion of oxidation, the reaction mixture is withdrawn from the reactor and cooled to about 20° C.

An insoluble phthalic acid fraction is filtered from the cooled reaction mixture. This fraction contains substantially all of the terephthalic and isophthalic acids produced and a substantial portion of the ortho-phthalic acid.

The mother liquor is distilled at atmospheric pressure to remove an overhead comprising acetic acid and water of oxidation from a distillation bottoms. The bottoms consists of benzoic and ortho-phthalic acids, oxidation catalyst, and a large quantity of tar-like oxidation by-products.

The distillation bottoms, weighing 76.9 parts, is permitted to solidify and is extracted with 400 parts by weight of a 14 weight percent hydrochloric acid solution by boiling in an open corrosion resistant vessel equipped with a rotary agitator. A red oil or tar coalesces almost immediately and rapidly settles to the bottom, leaving the aqueous solution with a light green colorization due to the catalyst. The water-insoluble red oil is withdrawn from the bottom of the vessel and upon cooling solidifies to a light brown or tan-colored solid mass.

The tar-free aqueous extract is cooled to about 20° C. whereupon 21.6 parts by weight of very white crystalline benzene carboxylic acids are obtained and are filtered from solution. The crystals have an acid number of 468; the acid number of pure benzoic acid is 460 and of ortho-phthalic acid 675. Thus, the crystals are composed primarily of benzoic acid.

The water-insoluble tar fraction is subjected to three additional extractions with boiling 14% aqueous hydrochloric acid, each followed by separation of the insoluble tar layer and cooling of the extract to 20° C. in order to recover additional benzene carboxylic acids from the first tar fraction. The three extractions are conducted with 160, 160 and 100 parts of solvent respectively, and 2.5 parts (acid number 469), 1.9 parts (acid number 471) and 2.0 parts (acid number 465) of pure white carboxylic acids are recovered respectively by the extractions. Each fraction is composed primarily of benzoic acid.

The insoluble tar-containing phase obtained as a raffinate from the last extraction weighs 17.53 parts and has a deep tan color. By the use of ultraviolet analytical techniques, it is found to be comprised of about 66% benzoic acid, the balance being tar-like oxidation byproducts.

The mother liquors from each of the four extractions are combined and extracted with diethyl ether to recover dissolved benzene carboxylic acids. The ether extract is dried over anhydrous magnesium sulfate and evaporated, depositing 12.5 parts of light yellow carboxylic acids.

Thus, the four stage hydrochloric acid extraction recovers as substantially pure benzene carboxylic acids 36.4 weight percent of the original 76.9-part distillation bottoms, of which 77.3% of the recovery occurs in the first stage.

Example II

To illustrate the advantages in using acidified water over water alone in recrystallizing benzene carboxylic acids which are initially contaminated with tar-like oxidation byproducts, the following experiments are conducted.

Mixed xylenes corresponding to the composition employed for Example I are oxidized with air in an acetic acid medium in the presence of manganese and cobalt bromides as the catalyst. At the conlusion of the reaction, the reaction mixture is cooled to about 20° C. and solid product filtered therefrom. The mother liquor is evaporated (distilled) to dryness and four 5-part by weight samples of the distillation bottoms are obtained. Benzene carboxylic acids in the bottoms fraction are primarily benzoic and ortho-phthalic.

One sample is added to an open corrosion-resistant glass tank containing 25 parts of pure water, and the mixture heated to boiling and held at 100° C. for several minutes. A transparent red solution is obtained, which remains homogeneous on cooling until a temperature of about 45° C. is attained, after which tan-colored aromatic acids slowly crystallize from the solution.

The second 5-part sample is added to a glass tank containing 25 parts of 4 N hydrochloric acid and the mixture heated to boiling for several minutes. Even before boiling commences, the red tars coalesce and form tiny droplets of insoluble liquid which gradually settles to the bottom as a heavy red tar or oil while the remaining solution retains a light-green color. On cooling the tank contents, very white solid benzene carboxylic acids crystallize almost immediately. This clearly demonstrates that recrystallization from aqueous solutions is greatly facilitated by the presence of a strong acid to precipitate the byproducts. At a temperature of 60° C., the red tar solidifies to a brown solid.

The third sample is boiled with 25 parts of approximately 4 N hydrobromic acid. Results similar to those obtained with the second sample are observed.

The fourth 5-part sample is boiled with 25 parts of 1% aqueous hydrochloric acid. Coalescing occurs as readily as with 4 N HCl, and the crystallized aromatic acid product is of identical purity.

It is thus seen that in the presence of a strong acid, tar-like byproducts of the oxidation of aliphatic-substituted aromatic compounds having fewer than three oxidizable aliphatic groups in the molecule may be substantially completely removed from aqueous solutions, thus facilitating purification of benzene carboxylic acids or oxidation catalysts. By the procedure of the present invention it is possible to recover pure benzene carboxylic acids free from the presence of tars and oxidation catalysts.

Having described the invention, what is claimed is:

1. A process for resolving a mixture of (a) a recoverable material selected from the group consisting of benzoic acid and orthophthalic acid, and (b) water-soluble tar-like by-products, said recoverable material and said by-products being derived from the liquid-phase heavy-metal-catalyzed molecular-oxygen oxidation of substituted benzenes having from one to two oxidizable aliphatic substituents, inclusive, which process comprises: treating said mixture with a dilute aqueous solution of a strong mineral acid at a temperature within the range of about 20 to about 250° C. and in the presence of sufficient of said aqueous solution to dissolve said recoverable material, whereby said tar-like by-products coalesce and become water-insoluble, and thereafter separating said tar-like by-products from the aqueous solution containing the recoverable material dissolved therein.

2. Process of claim 1 wherein said recoverable material is benzoic acid.

3. Process of claim 1 wherein said recoverable material is orthophthalic acid.

4. Process of claim 1 wherein said treatment is effected by dissolving the recoverable material and by-products in an aqueous medium and thereafter introducing the strong mineral acid.

5. Process of claim 1 wherein said treatment is effected by extracting the mixture of recoverable material and by-products with an aqueous medium containing the strong mineral acid.

6. Process of claim 1 wherein the acid is hydrochloric acid.

7. Process of claim 1 wherein the acid is hydrobromic acid.

8. Process of claim 1 wherein the recoverable material is recovered from the resultant aqueous solution by crystallization.

9. A process for resolving a mixture of a heavy metal oxidation catalyst and water-soluble tar-like by-products, said oxidation catalyst and said by-products being derived from the liquid-phase heavy-metal-catalyzed molecular-oxygen oxidation of substituted benzenes having from one to two oxidizable aliphatic substituents, inclusive, which process comprises: treating said mixture with a dilute aqueous solution of a strong mineral acid at a temperature within the range of about 20 to about 250° C. and in the presence of sufficient of said aqueous solution to dissolve said heavy metal oxidation catalyst, whereby said tar-like by-products coalesce and become water-insoluble, and thereafter separating said tar-like by-products from the aqueous solution containing the heavy metal oxidation catalyst dissolved therein.

10. Process of claim 9 wherein the heavy metal oxidation catalyst, is recovered from the aqueous solution by alkalizing said solution.

11. Process of claim 9 wherein said catalyst is cobalt.

12. Process of claim 9 wherein said catalyst is manganese.

References Cited in the file of this patent

UNITED STATES PATENTS

| | | |
|---|---|---|
| 2,726,262 | Grosskinsky et al. | Dec. 6, 1955 |
| 2,848,487 | Keen | Aug. 19, 1958 |

FOREIGN PATENTS

| | | |
|---|---|---|
| 861,247 | Germany | Dec. 29, 1952 |